US007008582B2

(12) United States Patent
Chen

(10) Patent No.: US 7,008,582 B2
(45) Date of Patent: Mar. 7, 2006

(54) GOLF CLUB GRIP WITH ANTI-SLIP AND CONTROL ARRANGEMENT

(76) Inventor: Yung-Hsiang Chen, 2416 Gehrig St., Unit B, West Covina, CA (US) 91792

( * ) Notice: Subject to any disclaimer, the term of this patent is extended or adjusted under 35 U.S.C. 154(b) by 0 days.

(21) Appl. No.: 10/771,710

(22) Filed: Feb. 3, 2004

(65) Prior Publication Data

US 2005/0170905 A1 Aug. 4, 2005

(51) Int. Cl.
*B29C 70/46* (2006.01)

(52) U.S. Cl. ...................... 264/132; 264/139; 264/257; 264/258; 264/516; 264/324; 264/325

(58) Field of Classification Search ........ 264/510–512, 264/516, 257–258, 102, 571, 324–325, 132, 264/139

See application file for complete search history.

(56) References Cited

U.S. PATENT DOCUMENTS 4,919,420 A * 4/1990 Sato ......................... 273/81 B
5,322,290 A * 6/1994 Minami ................... 273/187.5
6,666,777 B1 * 12/2003 Lamkin et al. ............. 473/300
6,686,301 B1 * 2/2004 Li et al. ..................... 442/157

* cited by examiner

*Primary Examiner*—Stefan Staicovici
(74) *Attorney, Agent, or Firm*—Raymond Y. Chan; David & Raymond

(57) ABSTRACT

A method of making golf club grip includes the steps of overlapping a textile fabric on a first raw rubber layer and painting a rubber latex on the textile fabric to attach the textile fabric on the first raw rubber layer to form a thin reinforced rubber layer laminated with the textile fabric; preparing a second raw rubber layer which is shaped and sized to form two control members; shaping the first raw rubber layer to form two anti-slip members; aligning the anti-slip members with the control members in an end to end manner in two halves of heat mold respectively; and vulcanizing the anti-slip members and the control members in a heat mold to form the golf club grip including a tubular anti-slip arrangement and a tubular control arrangement coaxially extended from a lower end of the anti-slip arrangement.

6 Claims, 5 Drawing Sheets

GOLF CLUB GRIP WITH ANTI-SLIP AND CONTROL ARRANGEMENT

BACKGROUND OF THE PRESENT INVENTION

1. Field of Invention

The preset invention relates to a golf club grip, and more particularly to an anti-slip and control arrangement that includes an upper anti-slip arrangement connected coaxially with a lower control arrangement to form a tapered tubular body for attaching to a holding end portion of a shaft of a golf club.

2. Description of Related Arts

Golf is one of the most popular sports in the world. All lower handicapped golfers recognize that the main key of having a good golf swing mostly depends on whether the golfer correctly grips the golf club.

No matter whether a golfer uses an interlocking grip, a natural grip or an overlapping grip, a proper grip is one of the most important fundamental. If the golfer grips his or her golf club too tight, his or her arms will be too tense to release the body twisting power to maximize the club head speed at impact of the golf ball through a golf swing. On the other hand, if the golfer grips his or her golf club too loose, the golf club may slip out of his or her hands through the golf swing. Also, the power from the uncoiling body will fail to transmit to the golf club through the golfer's hands. The flying trajectory, such as straight, draw or fade, of the golf ball can also be controlled by the gripping hands of the golfer.

The term "grip" is misleading since it implies a forceful pressure. In fact, a more proper way is to "mold" the golfer's hands into the proper position, and then to hold the golf club with the proper amount of pressure that allows the hands to work together to control the club head. For a right-hand golfer, his or her left hand will be the upper holding hand and his or her right hand will be the lower controlling hand. For a left-hand golfer, the right hand will be the upper holding hand and the left hand will be the lower controlling hand.

The middle finger H1, ring finger H2 and little finger H3 of the upper holding hand H, i.e. the left hand of a right-hand golfer, are used to hold on the upper end portion of the grip G of a golf club, as shown in FIG. 5. The three holding fingers H1, H2 and H3 should apply an appropriate pressure to the grip G that is enough to support and hold the golf club through the grip G. In other words, the golfer should be capable of holding the golf club at the upper end portion of the grip G without the other hand and the thumb and index finger contacting the grip G. By means of the three holding fingers H1, H2 and H3 with appropriate pressure applied to the grip, the arm of the golfer should become an extension of the golf club hinged to the golfer's body with his or her shoulder. The appropriate holding pressure of the three holding fingers H1, H2, H3 applied to the grip G varies with the weight and length of the golf club as well as the nature of the grip G. The minimum holding pressure should be just enough to hold the golf club to prevent slipping off the hand through the golf swing. Then, the index finger and the thumb of the upper holding hand H should be simply placed on the grip G in position as shown in FIG. 5.

Then, simply place the lower controlling hand H' on a middle portion of the grip G in such a manner that the ring finger H2', the middle finger H3' and the index finger H4' are placed on the grip G and aligned with the middle finger H3 of the upper holding hand H while the little finger H1' of the controlling hand H' is overlapped on top of the middle finger H3 of the holding hand H for an overlapping grip, or the little finger H1' of the controlling hand H' is interlocked with the middle finger H3 of the holding hand H for an interlocking grip. Also, the index finger and the thumb of the upper holding hand H should be simply placed on the grip in position as shown in FIG. 5 while the center of the palm of the controlling hand H' is facing the target. The grip pressure of the controlling hand H' is applied at the contacts of the middle phalanges H21', H31' of the ring finger H2' and the middle finger H3' of the controlling hand H' with the grip G.

In fact, by varying a few pressure points, you can better shape your shots. For example, in order to hit a fade, the golfer can grip the golf club a little bit tighter with the litter finger H1, the ring finger H2 and the middle finger H3 of the holding hand H. Also, when more pressure is exerted by the thumb and index finger of the controlling hand H' of the golfer, a right-to-left trajectory will be resulted.

In addition, the golfer can control the ball flying trajectory between a hook to a slice simply by adjusting the gripping position of the controlling hand H' with respect to the gripping position of the holding hand H, such as a strong grip or a weak grip. The grip pressure of the controlling hand H' is for feeling and controlling but not for supporting and holding the golf club. Therefore, the grip pressure of the controlling hand H' should be merely tight enough to control the club but still light enough to allow you to feel the weight of the golf club throughout the swing.

It is why most of the golfers wear gloves with their holding hands to enhance frictional contact with the grip but keeping their controlling hands bare to ensure feeling for swing control.

No matter whether the golfer grips the golf club somewhat firmly or softly, what is really important is keeping your level of grip pressure constant throughout the swing. Therefore, the nature and surface condition of the grip can substantially affect the golfer to apply the appropriate grip pressure. Some golf club grips provide anti-slip design on the grip surface for better frictional contact with the golfer's hands, it can substantially help to prevent slipping and provide constant grip pressure throughout the swing for the holding hand but may adversely affect the control and feeling of the controlling hand. Some golf club grips provide smooth and soft grip surface for better controlling but it also invites the holding hand to grip tighter to prevent slipping off. However, any excess grip pressure through the hand may also tense the arm and shoulder muscles and unexpectedly affect the golf swing. How to produce a grip that fits to the different needs of the holding hand and controlling hand of a golfer becomes a challenge for the development of a better club.

SUMMARY OF THE PRESENT INVENTION

An objective of the present invention is to provide a golf club grip with anti-slip and control arrangement which includes an upper anti-slip arrangement connected coaxially with a lower control arrangement to form a tubular body for attaching to a holding end portion of a shaft of a golf club, wherein the anti-slip arrangement provides a frictional surface to enable the three holding fingers (i.e. the middle, ring and little fingers) of a gloved holding hand of the golfer to better holding the golf club with appropriate pressure and the control arrangement provides a smoother surface to ensure better feeling and control for the bared controlling hand of the golfer.

Another objective of the present invention is to provide a golf club grip with anti-slip and control arrangement which provides an anti-slip arrangement at an upper portion and a control arrangement at a lower portion, wherein the anti-slip arrangement further comprises a cotton yarn reinforced surface layer to provide a coarse surface for better frictional contact with the gloved holding hand of the golfer and a harder surface structure than the control arrangement to ensure an anti-slipping grip with appropriate pressure while the control arrangement still provide a softer and smoother feel for controlling grip of the bared controlling hand of the golfer.

Another objective of the present invention is to provide a golf club grip with anti-slip and control arrangement, wherein the anti-slip arrangement of the grip has a length long enough for the three holding fingers (the middle, ring and little fingers) and the index finger of the upper holding hand of the golfer to completely grip thereon normally while the index finger is just placed at the lower end of the anti-slip arrangement, so that the ring, middle and index fingers of the controlling hand can naturally place on the control arrangement of the grip and align immediately with the index finger of the holding hand.

Another objective of the present invention is to provide a golf club grip with anti-slip and control arrangement, wherein the anti-slip arrangement at an upper portion of the grip and the control arrangement at a lower portion of the grip are made of rubber in different colors for purposes of decoration and identification of the two portions for proper gripping with the holding and controlling hands of the golfer.

Another objective of the present invention is to provide a golf club grip with anti-slip and control arrangement, wherein an upper portion of a bottom side of the control arrangement is provided with an anti-slip surface structure which is sized and shaped to ensure the middle phalanges of the ring, middle and index fingers of the lower controlling hand are in contact therewith to provide a better frictional contact for some golfers.

Another objective of the present invention is to provide a method for manufacturing the golf club grip with anti-slip and control arrangement in economic cost, in which the cotton yarn surface reinforced anti-slip arrangement is integrated with the control arrangement to form an integral body with an even thickness at the junction between the lower end of the anti-slip arrangement and the upper end of the control arrangement so as to ensure a comfortable interlocking, natural or overlapping grip between the holding hand and the controlling hand of the golfer.

Accordingly, in order to accomplish the above objects, the present invention provides a golf club grip for a golf club comprising a shaft and a club head attached to a lower end of the shaft, wherein the golf club grip comprises:

a lower control arrangement which is a rubber made tube having a lower end, an upper end and a gripping surface having a softness adapted for enhancing a sense of touching feel for a controlling hand of the golfer to grip thereon;

an upper anti-slip arrangement which is a rubber made tube having an upper end and a lower end coaxially integrated with the upper end of the control arrangement to form an elongated integral tubular body for attaching to an upper end portion of the shaft of the golf club, wherein the anti-slip arrangement provides an outer anti-slipping surface to provide a predetermined gripping friction for a holding hand of the golfer to grip thereon, wherein the anti-slip arrangement has a length at least long enough for at least a middle finger, a ring finger and a little finger of the holding hand of the golfer to be completely gripped thereon, so that a ring finger, a middle finger and an index finger of the controlling hand of the golfer is capable of naturally placing on the control arrangement; and a rubber made endpiece integrally formed at the upper end of the anti-slip arrangement.

In a preferred embodiment, the anti-slip surface of the anti-slip arrangement is integrally coated with a thin reinforced rubber layer laminated with cotton yarn to provide a frictional coarse surface as the outer anti-slipping surface for frictional contact with the golfer's holding hand and to limit and control the elasticity of the rubber material to produce a reinforced harder surface for better holding feel of the holding hand of the golfer.

In a preferred embodiment, an upper portion of a bottom side of the control arrangement is provided with an anti-slip surface integrally coated with a thin reinforced rubber layer laminated with cotton yarn which is sized and shaped to ensure the middle phalanges of the ring, middle and index fingers of the lower controlling hand are in contact therewith to provide a better frictional contact for some golfers.

In a preferred embodiment, the anti-slip arrangement is long enough to enable an index finger of the holding hand of the golfer placing at the lower end thereof and the ring finger of the controlling hand can be aligned with the index finger of the holding hand.

The present invention further provides a method of manufacturing a golf club grip as described above, comprising the steps of:

(a) overlapping a cotton yarn or the like on an exterior surface of a first raw rubber layer and painting a rubber latex on the cotton yarn to attach the cotton yard on the exterior surface of the first raw rubber layer to form a thin reinforced rubber layer laminated with the cotton yarn;

(b) preparing a second raw rubber layer which is shaped and sized to form at least at pair of control members;

(c) shaping the first raw rubber layer that is coated with the cotton yarn laminated rubber layer to form at least pair of anti-slip members;

(d) aligning the pair of anti-slip members with the pair of control members in an end to end manner in two halves of heat mold respectively; and (e) vulcanizing the pair of anti-slip members and the pair of control members in the heat mold to form a golf club grip which is a tubular body including a tubular anti-slip arrangement and a control arrangement coaxially extended from a lower end of the anti-slip arrangement, wherein the raw rubber of the pair of anti-slip members are vulcanized and integrated to form the tubular anti-slip arrangement while the cotton yarn reinforced rubber layers are also vulcanized to integrally coat on an outer circumferential surface of the anti-slip arrangement, wherein the raw rubber of the pair of control members is vulcanized with the lower end of the anti-slip arrangement to form the tubular control arrangement which is integrated coaxially with the anti-slip arrangement.

In the step (a), each half of anti-slip member has two or more longitudinal sections having different thickness to form a tapered tubular body and appropriate weight of raw rubber to ensure the junction between the anti-slip arrangement and the control arrangement being evenly integrated to provide an even thickness here.

These and other objectives, features, and advantages of the present invention will become apparent from the following detailed description, the accompanying drawings, and the appended claims.

DETAILED DESCRIPTION OF THE PREFERRED EMBODIMENT

Figure 1:
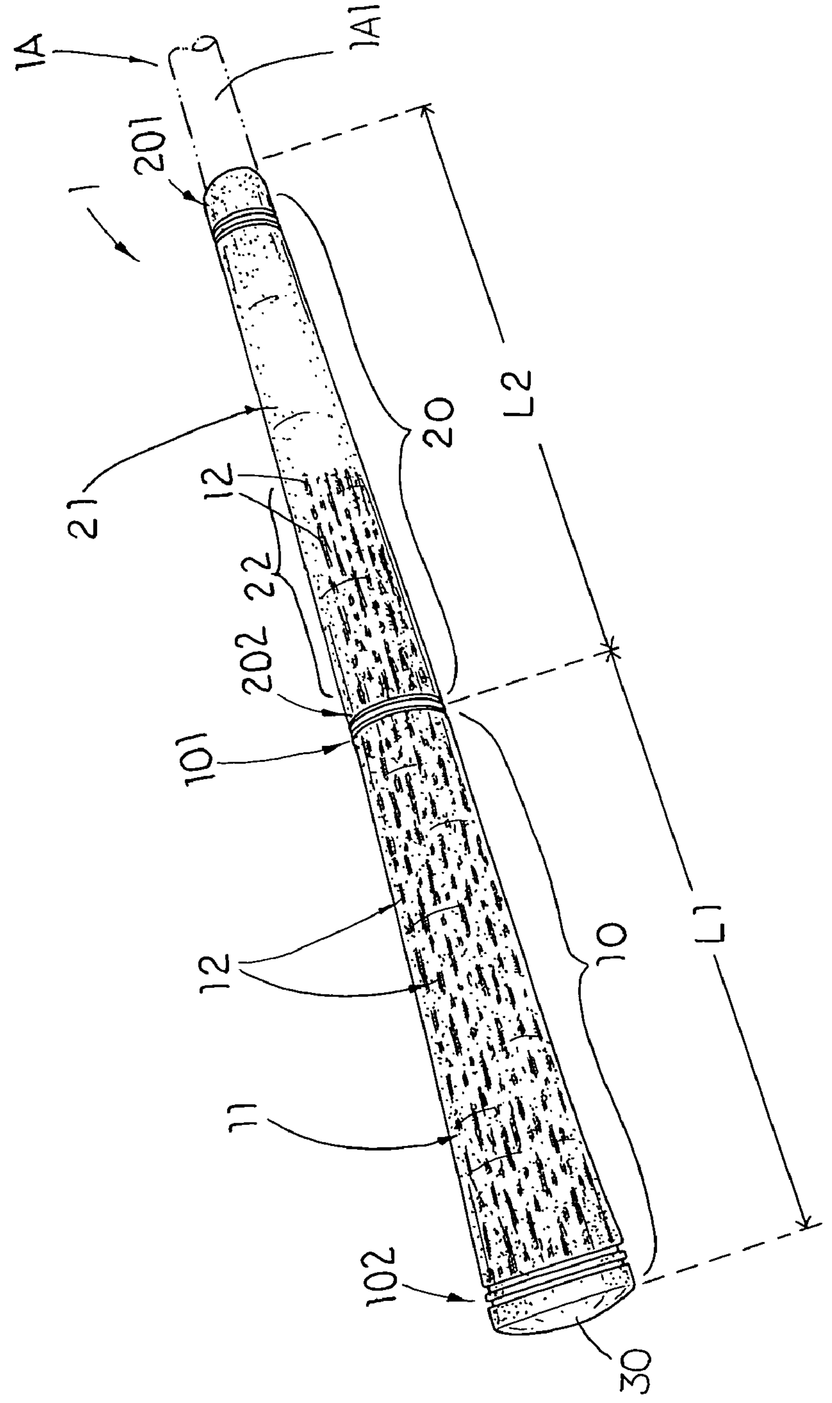
FIG. 1 is a perspective of a gold club grip according to a preferred embodiment of the present invention.

Referring to FIGS. 1 to 4 of the drawings, a golf club grip 1 for a golf club 1A according to a preferred embodiment of the present invention is illustrated, wherein the golf club grip 1 comprises an anti-slip arrangement 10 and a control arrangement 20.

The lower control arrangement 20 is a rubber made tube having a lower end 201, an upper end 202 and a circumferential gripping surface 21 that has a softness adapted for enhancing a sense of touching feel for a controlling hand H' of a golfer to grip thereon.

The anti-slip arrangement 10, which is a rubber made tube having a lower end 101 and an upper end 102, wherein the lower end 101 is coaxially integrated with the upper end 202 of the control arrangement 20 to form an elongated integral tubular body for attaching to an upper end portion of the shaft 1A of the golf club. The anti-slip arrangement 10 provides a circumferential anti-slipping surface 11 to provide a predetermined gripping friction for a holding hand H of the golfer to grip thereon.

The upper end 102 of the anti-slip arrangement 10 of the golf club grip 1 further integrally provides a rubber made endpiece 30 to cover the upper end 102. The elongated integral tubular body of the golf club grip 1 is adapted for coaxially attaching to an upper end portion of a shaft 1A1 of the golf club 1A that can be a driver, a fairway wood, an iron, or a putter. The anti-slipping surface 11 of the anti-slip arrangement 10 is constructed to provide a predetermined gripping friction for the holding hand H which generally wears a golf glove to grip thereon.

Figure 4:
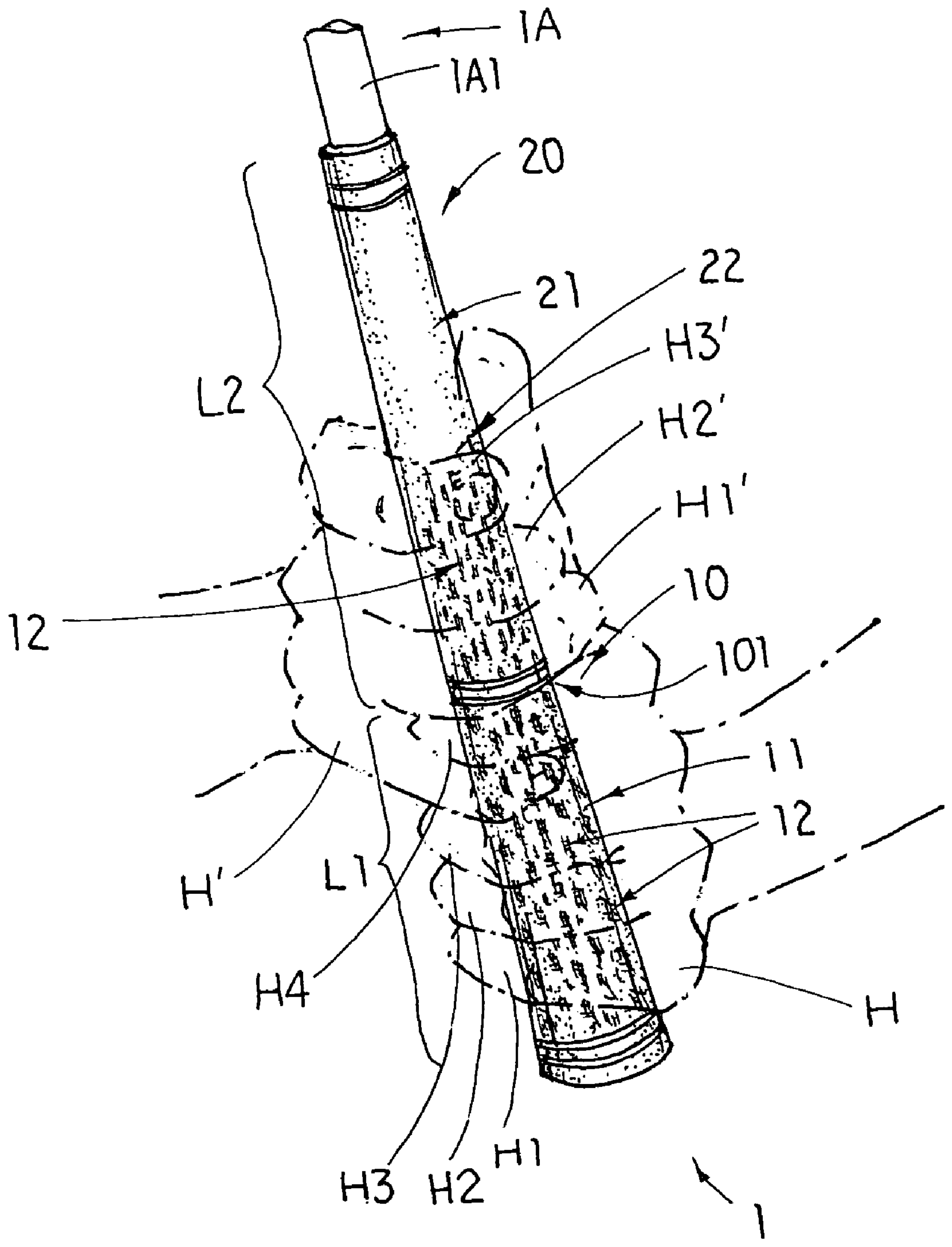
FIG. 4 is a schematic bottom view of the golf club grip attached to the golf club according to the above preferred embodiment of the present invention, illustrating the anti-slip arrangement gripped by a holding hand of a golfer and a control arrangement gripped by another controlling hand of the golfer.
Figure 5:
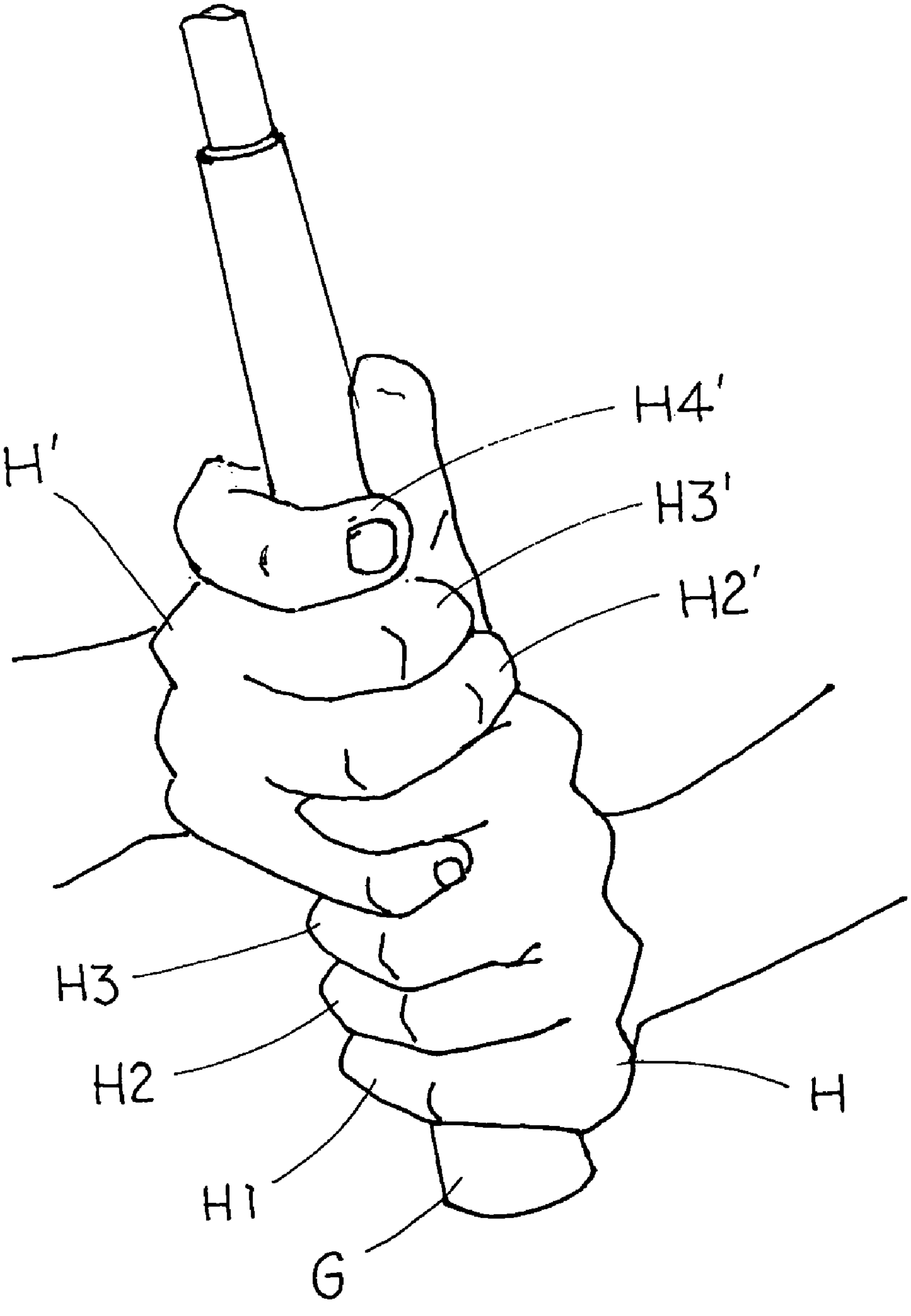
FIG. 5 PRIOR ART
FIG. 5 is a schematic view of a conventional golf club grip with a golfer gripped with both hands.

Referring to FIGS. 1 and 4, the anti-slip arrangement 10 has a predetermined length L1 long enough for at least a middle finger H3, a ring finger H2 and a little finger H1 of the holding hand H of the golfer to be completely gripped thereon and that a ring finger H2', a middle finger H3' and an index finger H4' of the controlling hand H' of the golfer is capable of naturally placing on the control arrangement 20. Of course, the golf club grip 1 can be classified into man size, woman size, teenager size, and child size according to the different sizes of their hands. Therefore, the length L1 of the anti-slip arrangement 10 should be varied from different size of the holding hand of man, woman, teenager, or children of different age according to the requirement as described above.

Figure 3:
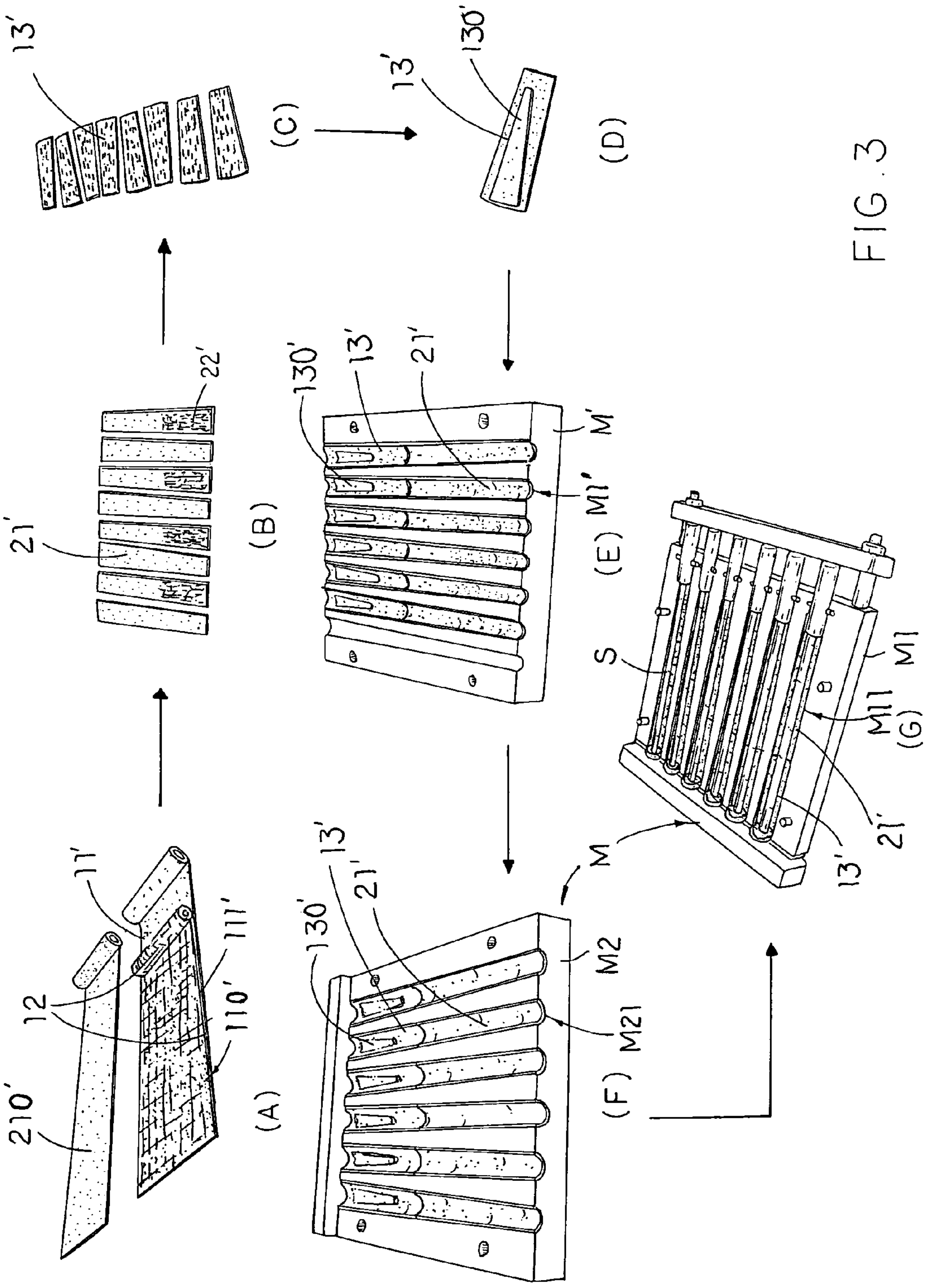
FIG. 3 illustrates a step of a method of manufacturing a golf club grip for the golf club according to the above preferred embodiment of the present invention.

In order to better understand the novel structure of the golf club grip 1 of the present invention, a method of manufacturing the golf club grip 1 according to the preferred embodiment of the present invention is illustrated in FIG. 3 and described in the following, wherein the method comprises the following steps.

(a) Overlap a textile fabric such as a cotton yarn 12 or the like on an exterior surface of a first raw rubber layer 11' and paint a rubber latex 110' on the cotton yarn 12 to attach the cotton yard 12 on the exterior surface of the first raw rubber layer 11' to form a thin reinforced rubber layer 111' laminated with the cotton yarn 12, as shown in FIG. 3(A).

(b) Prepare a second raw rubber layer 210' which is shaped and sized to form at least a pair of control members 21', as shown in FIG. 3(B).

(c) Shape the first raw rubber layer 111' that is coated with the cotton yarn laminated rubber layer 111' to form at least a pair of anti-slip members 13', as shown in FIGS. 3(A) and 3(C).

(d) Align the pair of anti-slip members 13' with the pair of control members 21' in an end to end manner in two halves of heat mold M respectively.

Figure 2:
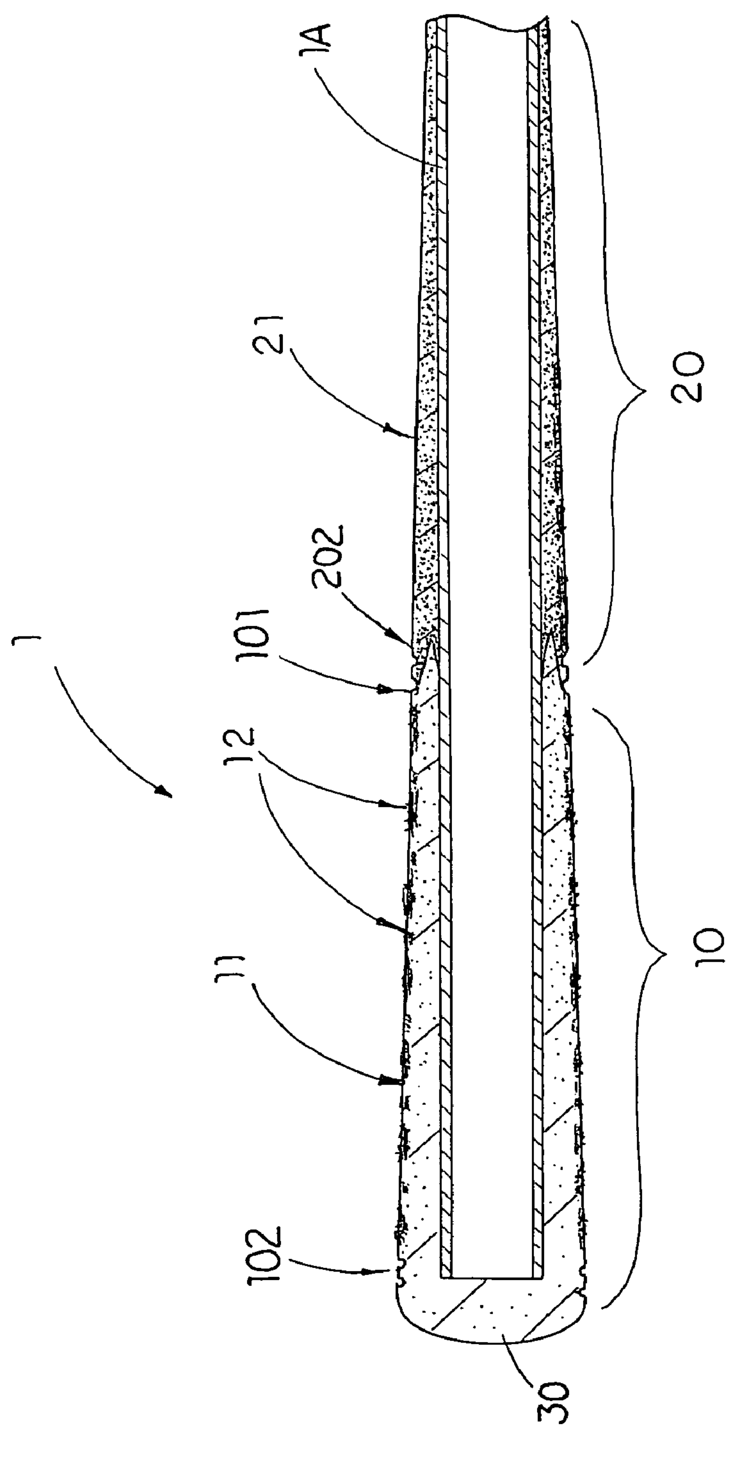
FIG. 2 is a cross-sectional view of the golf club grip with the golf club according to the above preferred embodiment of the present invention.

(e) Vulcanize the pair of anti-slip members 13' and the pair of control members 21' in the heat mold to form the golf club grip 1 including the tubular anti-slip arrangement 10 and the control arrangement 20 coaxially extended from the lower end of the anti-slip arrangement 10, wherein the raw rubber of the pair of anti-slip members 13' is vulcanized and integrated to form the tubular anti-slip arrangement 10 while the cotton yarn reinforced rubber layers 111' are also vulcanized to integrally coat on an outer circumferential surface of the anti-slip arrangement 10, wherein the raw rubber of the pair of control members 21' is vulcanized with and extended from the lower end 101 of the anti-slip arrangement 10 to form the tubular control arrangement 20 which is integrated coaxially with the anti-slip arrangement 10, as shown in FIGS. 1 and 2.

In which, the first and second raw rubber layers 11' and 210' may have different compositions so that, after the vulcanization process, the anti-slip members 13' can be harder than the control members 21'. Various additives may be added into the first and second raw rubber layers 11', 21' to control their hardness and softness. For example, sulfur can be used to harden the raw rubber and keep it remaining flexible in the room temperature.

In addition, before the steps (a), the manufacturing method of the present invention further comprises a step of coloring the first raw rubber layer 11' and/or the second raw rubber layer 210' so as to provide a two-tone colored golf club grip 1, wherein the anti-slip arrangement 10 at an upper portion of the golf club grip 1 and the control arrangement 20 at a lower portion of the golf club grip 1 have different colors for purposes of decoration and identification of the two portions for proper gripping with the holding and controlling hands H, H' of the golfer.

In the step (a), the cotton yarn 12 which is overlapped on the exterior surface of the first raw rubber layer 11' is adhered on the exterior surface of the first raw rubber layer 11' by the rubber latex 110' such that, during the vulcanization step (e), the rubber latex 110' of the thin reinforced rubber layer 111' is vulcanized to integrate with the first raw rubber layer 11' to form the anti-slip arrangement 10. The amount of the rubber latex 110' to be painted on the exterior surface of the first raw rubber layer 11' is to form a thin layer of rubber latex 110' having a thickness slightly smaller than a diameter of each cotton filament of the cotton yarn 12. In other words, the cotton yarn 12 would not be completely covered by the rubber latex 110' and at least a portion of the cotton yarn 12 should be evenly and spacedly exposed outside around the anti-slip arrangement 10 after vulcanization so as to produce a coarse exterior surface as the anti-slipping surface 11 so that the holding hand H of the golfer can be substantially in contact with such exposed portions of the cotton yarn 12. Accordingly, the anti-slipping surface 111 not only provides a frictional contact with the golfer's holding hand H but also limits and controls the elasticity of the rubber material to produce a reinforced harder surface for better holding feel of the holding hand H of the golfer.

In order to provide a better gripping effect, most of the golf club grips 1 are made in taper shape, i.e. to gradually increase its outer diameter from a lower end to an upper end. Especially, the taper angle of the upper end 102 of the anti-slip arrangement 10 generally increases for a better holding effect so that the thickness of the upper end 102 is much thicker than that of the lower end 101, as shown in FIG. 2. In addition, in order to ensure an even and smooth integration of the raw rubber materials of the lower ends of the anti-slip members 13' and the upper ends of the control members 21' to form the elongated integral tubular body of the golf club grip 1.

Each of the anti-slip members 13' has two or more longitudinal sections having different weight of raw rubber to form a tapered tubular body and to ensure the junction between the anti-slip arrangement and the control arrangement being evenly integrated to provide an even thickness there. In order to doing so, as shown in FIG. 3(D), a taper shaped additional raw rubber piece 130' is attached to an interior surface of each of the anti-slip members 13' so as to gradually increase the weight of total raw rubber from the lower end to the upper end.

Both the anti-slip members 13' and the control members 21' should be weighted to ensure quality. Preferably, the weight of each of the anti-slip members 13' is approximately 18.8 g and the weight of each of the control members 21' is approximately 11.8 g.

As shown in FIGS. 3(B) and 3(C), both the anti-slip members 13' and the control members 21' are each cut into a predetermined taper shape adapted to form a semi-tubular shape member corresponding to the designated size and shape of the upper portion and lower portion of golf club grip 1.

As shown in FIGS. 3(F) and 3(G), the anti-slip members 13' and the control members 21' are aligned in an end-to-end manner in a semi-circular mold socket M11 or M12 of one of the base mold M1 and the upper mold M2 of a steel made vulcanization mold M. The semi-circular mold sockets M11 and M12 are aligned to form a plurality of tubular mold sockets after the base mold M1 and the upper mold M2 are connected together, wherein a plurality of core shafts S are coaxially placed inside the tubular mold sockets respectively to ensure the tubular shape of the golf club grip 1 after vulcanization. During the vulcanization, the temperature within the vulcanization mold M should be heated to 100 degree Celsius or more.

According to the preferred embodiment, as shown in FIG. 3(E), before the step (e), the method may further comprise a pre-shaping step in an aluminum mold M', wherein a half of the anti-slip member 13' and a half of the control member 21' are aligned end to end in a semi-circular mold socket M1' of the aluminum mold M' to form a semi-tubular body before the vulcanization.

According to the golf club grip 1 of the present invention, as shown in FIG. 4, the upper anti-slip arrangement 10 is integrated coaxially with the lower control arrangement 20, wherein the anti-slip arrangement 10 provides a frictional surface to enable the three holding fingers H1, H2, H3 (i.e. the middle, ring and little fingers) of a gloved holding hand H of the golfer to better holding the golf club 1A with appropriate pressure and the control arrangement 20 provides a smoother surface to ensure better feeling and control for the bared controlling hand H' of the golfer.

The anti-slip arrangement 10 further comprises a cotton yarn reinforced coarse surface as the anti-slip surface 11 for better frictional contact with the gloved holding hand H of the golfer and a harder surface structure than the control arrangement 20 to ensure an anti-slipping grip with appropriate pressure while the control arrangement 20 still provide a softer and smoother feel for controlling grip of the bared controlling hand H' of the golfer.

As mentioned above, as shown in FIGS. 1 and 4, the anti-slip arrangement 10 of the golf club grip 1 has a length L1 long enough for the three holding fingers H1, H2, H3 (the middle, ring and little fingers) and the index finger H4 of the upper holding hand H of the golfer to completely grip thereon normally while the index finger H4 is just placed at the lower end 101 of the anti-slip arrangement 10, so that the ring, middle and index fingers H2', H3' and H4' of the controlling hand H' can naturally place on the control arrangement 20 of the golf club grip 1 and align immediately with the index finger H4 of the holding hand H. Also, the control arrangement 20 should generally have a length L2 longer than a size of the controlling hand H' for a completely and comfortably grip thereon.

According to the preferred embodiment of the present invention, as shown in FIGS. 1 and 4, for some golfers who may need to hold the golf club with their lower controlling hands H' with more pressure, an upper portion of a bottom side of the control arrangement 20 can be made to provide with an additional anti-slip portion 22 which is sized and shaped to ensure the middle phalanges of the ring, middle and index fingers H2', H3' and H4' of the lower controlling hand H' are in contact therewith to provide a better frictional contact for those golfers. In order to made such additional anti-slip portion 22, in the step (b) of the manufacturing method of the golf club grip 1, a piece of cotton yarn 22' is attached to an upper end portion of an exterior surface of one of the pair of control members 21' by painting a rubber latex onto the piece of cotton yarn 22' like the adhering method of the cotton yarn 12' on the first raw rubber layer 11' as taught in the step (a).

Since the cotton yarn surface reinforced anti-slip arrangement 10 is integrated with the control arrangement 20 to form an integral body where the lower end 101 of the anti-slip arrangement 10 is fused with the upper end 202 of the control arrangement 20 so as to ensure a comfortable interlocking, natural or overlapping grip between the holding hand H and the controlling hand H' of the golfer.

It is worth to mention that the cotton yarn 12 of the anti-slip arrangement 10 renders a less elasticity than the control arrangement 20 and provides a reinforced harder surface while the control arrangement 20 would have a softness softer than the anti-slip arrangement 10 for enhancing a sense of touching for the controlling hand H' of the golfer. Therefore, the golfer is able to swing the golf club 1A by securely holding the anti-slip surface 11 by the gloved holding hand H while feelingly control the golf club 1A by holding the controlling hand H' on the gripping surface 01 of the control arrangement 20. The anti-slip arrangement 10 can be made harder than the control arrangement 20 in the sense that the anti-slip arrangement 10 is less deformative with respect to pressure.

One advantage of the present invention is that since the anti-slip arrangement 10 and the control arrangement 20 have various elasticity, a greater frictional force is created between the anti-slip arrangement 10 and the golf glove of the holding hand H while a lesser frictional force is created between the control arrangement 20 and the bare hand of the golfer. Since the bare hand, i.e. the controlling hand H', of the golfer directly contacts with the control arrangement 20, the fingers of the bare hand have better sense of touching comfortably so as to enhance the control of the golf club 1A. In addition, the vibration of the golf club 1A during the swing could be absorbed by the control arrangement 20 so as to further enhance the swinging control of the golf club 1A. Therefore, the golfer would feel comfortable when his or her controlling hand H' holds the control arrangement 20 and his or her holding hand H holds the anti-slip arrangement 10. This arrangement reduces the risk of the bare hand getting hurt and also helps the gloved hand to apply swinging force to golf club 1 directly.

Also, as described above, a color of the control arrangement 20 is different from a color of the anti-slip arrangement 10 to form a two-tone color club grip. The anti-slip arrangement 10 and the control arrangement 20 are made of rubbers of different colors and hardness for purposes of identification and various elasticity. Accordingly, the rubbers of different elasticity are dyed of different colors. Thus, the anti-slip arrangement 10 and the control arrangement 20 would appear in different colors so as to help the golfer to identify the two portions. As a result, the golfer can easily place her hands onto the correct portions. Moreover, the different colors serve the aesthetic purposes and make the club more attracting. In addition to the various colors, the portions may be variously patterned and decorated with paints for the purposes of increasing the frictional contact and decoration. For example, stripes of colors are provided at the ends and interface of the anti-slip arrangement 10 and control arrangement 20, respectively. The stripes can be any colors different from those of the anti-slip arrangement 10 and the control arrangement 20 in order for indication of the same.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of manufacturing a golf club grip for a golf club including a shaft and a club head attached to a lower end of the shaft, wherein the method comprises the steps of:

(a) overlapping a textile fabric on an exterior surface of a first raw rubber layer and painting a rubber latex on said textile fabric to attach said textile fabric on said exterior surface of said first raw rubber layer to form a thin reinforced rubber layer laminated with said textile fabric;

(b) preparing a second raw rubber layer which is shaped and sized to form at least a pair of control members;

(c) shaping said first raw rubber layer that is coated with said textile fabric laminated rubber layer to form at least a pair of anti-slip members;

(d) aligning said pair of anti-slip members with said pair of control members in an end to end manner in two halves of a heat mold respectively; and (e) vulcanizing said pair of anti-slip members and said pair of control members in said heat mold to form said golf club grip including a tubular anti-slip arrangement and a tubular control arrangement coaxially extended from a lower end of said anti-slip arrangement, wherein said raw rubber of said pair of anti-slip members is vulcanized and integrated to form said tubular anti-slip arrangement while said textile fabric reinforced rubber layers are also vulcanized to integrally coat on an outer circumferential surface of said anti-slip arrangement, wherein said raw rubber of said pair of control members is vulcanized with and extended from said lower end of said anti-slip arrangement to form said control arrangement which is integrated coaxially with said anti-slip arrangement, wherein said anti-slip arrangement has a length at least long enough for at least a middle finger, a ring finger and a little finger of the holding hand of a golfer to completely grip thereon, so that a ring finger, a middle finger and an index finger of said controlling hand of said golfer is capable of naturally placing on said control arrangement, wherein, in the step (a), said textile fabric is cotton yarn which is adhered on said exterior surface of said first raw rubber layer by said rubber latex such that, during the vulcanization step (e), said rubber latex of said thin reinforced rubber layer is vulcanized to integrate with said first raw rubber layer to form said anti-slip arrangement, wherein a predetermined amount of said rubber latex is painted on said exterior surface of said first raw rubber layer to form a thin layer of rubber latex having a thickness slightly smaller than a diameter of each cotton filament of said cotton yarn and thus at least a portion of said cotton yarn is evenly and spacedly exposed outside around said anti-slip arrangement after vulcanization so as to produce a coarse exterior surface as said anti-slipping surface.

2. The method, as recited in claim 1, wherein said anti-slip members and said control members are aligned in an end-to-end manner in a semi-circular mold socket of one of a base mold and a upper mold of a steel made vulcanization mold, wherein said semi-circular mold sockets are aligned to form a plurality of tubular mold sockets after said base mold and said upper mold are connected together, wherein a plurality of core shafts is coaxially placed inside said tubular mold sockets respectively to ensure a tubular shape of said golf club grip after vulcanization, wherein during said vulcanization, a temperature within said vulcanization mold is heated to 100 degree Celsius or more.

3. The method, as recited in claim 2, before the step (e), further comprising a step of aligning each of said anti-slip members and each of said control members end to end in a semi-circular mold socket of an aluminum mold and pre-shaping each of said anti-slip members and each of said control members to form semi-tubular bodies before the vulcanizing step (e).

4. A method of manufacturing a golf club grip for a golf club including a shaft and a club head attached to a lower end of the shaft, wherein the method comprises the steps of:

(a) overlapping a textile fabric on an exterior surface of a first raw rubber layer and painting a rubber latex on said textile fabric to attach said textile fabric on said exterior surface of said first raw rubber layer to form a thin reinforced rubber layer laminated with said textile fabric;

(b) preparing a second raw rubber layer which is shaped and sized to form at least a pair of control members;

(c) shaping said first raw rubber layer that is coated with said textile fabric laminated rubber layer to form at least a pair of anti-slip members;

(d) aligning said pair of anti-slip members with said pair of control members in an end to end manner in two halves of a heat mold respectively;

(e) vulcanizing said pair of anti-slip members and said pair of control members in said heat mold to form said golf club grip including a tubular anti-slip arrangement and a tubular control arrangement coaxially extended from a lower end of said anti-slip arrangement, wherein said raw rubber of said pair of anti-slip members is vulcanized and integrated to form said tubular anti-slip arrangement while said textile fabric reinforced rubber layers are also vulcanized to integrally coat on an outer circumferential surface of said anti-slip arrangement, wherein said raw rubber of said pair of control members is vulcanized with and extended from said lower end of said anti-slip arrangement to form said control arrangement which is integrated coaxially with said anti-slip arrangement, wherein said anti-slip arrangement has a length at least long enough for an index finger, a middle finger, a ring finger, and a little finger of the holding hand of a golfer to completely grip thereon while the index finger placing at said lower end of said anti-slip arrangement, so that a ring finger, a middle finger and an index finger of said controlling hand of said golfer is capable of naturally placing on said control arrangement while the ring finger of the controlling hand is able to be aligned with the index finger of the holding hand, wherein, in the step (a), said textile fabric is cotton yarn which is adhered on said exterior surface of said first raw rubber layer by said rubber latex such that, during the vulcanization step (e), said rubber latex of said thin reinforced rubber layer is vulcanized to integrate with said first raw rubber layer to form said anti-slip arrangement, wherein a predetermined amount of said rubber latex is painted on said exterior surface of said first raw rubber layer to form a thin layer of rubber latex having a thickness slightly smaller than a diameter of each cotton filament of said cotton yarn and thus at least a portion of said cotton yarn is evenly and spacedly exposed outside around said anti-slip arrangement after vulcanization so as to produce a coarse exterior surface as said anti-slipping surface; and (f) disposing a taper shaped additional raw rubber piece on an interior surface of each of said anti-slip members so as to gradually increase a weight of total raw rubber from said lower end to said upper end of said anti-slip arrangement.

5. The method, as recited in claim 4, wherein said anti-slip members and said control members are aligned in an end-to-end manner in a semi-circular mold socket of one of a base mold and said upper mold of a steel made vulcanization mold, wherein said semi-circular mold sockets are aligned to form a plurality of tubular mold sockets after said base mold and said upper mold are connected together, wherein a plurality of core shafts is coaxially placed inside said tubular mold sockets respectively to ensure a tubular shape of said golf club grip after vulcanization, wherein during said vulcanization, a temperature within said vulcanization mold is heated to 100 degree Celsius or more.

6. The method, as recited in claim 5, before the step (e), further comprising a step of aligning each of said anti-slip members and each of said control members end to end in a semi-circular mold socket of an aluminum mold and pre-shaping each of said anti-slip members and each of said control members to form semi-tubular bodies before the vulcanizing step (e).

* * * * *